United States Patent [19]

Ishikawa et al.

[11] 4,051,194
[45] Sept. 27, 1977

[54] THERMOSETTING RESIN COMPOSITION FOR POWDER PAINT COMPRISING OF A (I) POLYMER CONSISTING OF β-METHYLGLYCIDYL (METH)ACRYLATE, STYRENE, UNSATURATED DIALKYL ESTER, ALKYLACRYLATE AND (II) SATURATED ALIPHATIC DIBASIC ACID

[75] Inventors: Noboru Ishikawa, Sakai; Hidehisa Nakamura, Osaka; Kazuyoshi Maruyama, Izumiohtsu; Akio Shoji, Sennan, all of Japan

[73] Assignee: Dainippon Ink and Chemicals, Inc., Tokyo, Japan

[21] Appl. No.: 629,129

[22] Filed: Nov. 5, 1975

[30] Foreign Application Priority Data

Nov. 11, 1974 Japan .............................. 49-129045

[51] Int. Cl.$^2$ .............. C08L 63/00; C08F 22/00; C08F 8/00; C08F 224/00
[52] U.S. Cl. .............................. 260/836; 526/15; 526/52; 526/218; 526/273
[58] Field of Search ............... 526/15, 56, 273; 260/836

[56] References Cited

U.S. PATENT DOCUMENTS

| | | | |
|---|---|---|---|
| 3,730,930 | 5/1973 | Labana ........................... | 526/56 |
| 3,752,870 | 8/1973 | Labana ........................... | 260/836 |
| 3,845,010 | 10/1974 | Labana et al. ................... | 526/56 |
| 3,845,016 | 10/1974 | Labana et al. ................... | 526/273 |
| 3,888,943 | 6/1975 | Labana et al. ................... | 526/273 |
| 3,890,282 | 6/1973 | Heilman .......................... | 526/273 |
| 3,893,977 | 7/1975 | Wingler .......................... | 526/273 |
| 3,914,333 | 10/1975 | Labana et al. ................... | 526/273 |
| 3,925,507 | 12/1975 | Katsimbas ....................... | 526/273 |
| 3,932,367 | 1/1976 | Labana et al. ................... | 526/273 |
| 3,939,127 | 2/1976 | Labana et al. ................... | 526/56 |

OTHER PUBLICATIONS

Nakajima, "Advances in Chem. Series" #125, ACS Wash. D.C., Myer Erzin, editor 1973.

*Primary Examiner*—Herbert J. Lilling
*Attorney, Agent, or Firm*—Wenderoth, Lind & Ponack

[57] ABSTRACT

A thermosetting resin composition for powder paints, which comprises

I. a polymer having a softening point, as measured by a ring-and-ball method, of 80° to 150° C. and a number average molecular weight of 3,000 to 15,000 and derived from (1) 10 to 40% by weight of β-methylglycidyl (meth)acrylate or a mixture of it with glycidyl (meth)acrylate, (2) 20 to 80% by weight of styrene, (3) 3 to 40% by weight of a dialkyl ester of an aliphatic unsaturated dibasic acid and (4) 0 to 30% by weight of an alkyl (meth)acrylate, and II. an aliphatic saturated dibasic acid.

10 Claims, No Drawings

THERMOSETTING RESIN COMPOSITION FOR POWDER PAINT COMPRISING OF A (I) POLYMER CONSISTING OF β-METHYLGLYCIDYL (METH)ACRYLATE, STYRENE, UNSATURATED DIALKYL ESTER, ALKYLACRYLATE AND (II) SATURATED ALIPHATIC DIBASIC ACID

This invention relates to a thermosetting resin composition for a useful powder paint which can form coatings of superior properties.

Since the thermosetting powder paint does not contain a solvent, the resulting coatings have the defect of inferior smoothness, gloss and brightness to thermosetting solvent-containing paint. This defect is especially pronounced when the powder paint contains an acrylic polymer as a vehicle, but can be remedied to some extent by reducing the molecular weight and softening point of the acrylic polymer. Such a measure, however, results in the reduced storage stability of the acrylic powder paint, and in the deterioration of the mechanical strength, adhesiveness, and stain resistance of the cured coatings. It has been extremely difficult therefore to impart various well-balanced properties to the acrylic powder paint. Furthermore, when such an acrylic powder paint is recoated and baked, the adhesion between the top coating and the under coating is poor, and the top layer is very liable to separate. Hence, in a coating line using these powder paints it has been impossible to perform recoating for correcting coating unevenness, and it has been necessary to remove all the coated surface having such flaws, and then return it to the coating line for further coating.

It is an object of this invention to provide an acrylic powder paint free from these defects.

We have found that an acrylic powder paint meeting the above object can be obtained by using a resin composition consisting of [I] a polymer derived from (1) β-methylglycidyl (meth)acrylate or a mixture of it with glycidyl (meth)acrylate, (2) styrene, (3) a dialkyl ester of an aliphatic unsaturated dibasic acid and (4) an alkyl (meth)acrylate, and [II] an aliphatic saturated dibasic acid as a vehicle.

Powder paints prepared from the composition of this invention possess various well-balanced properties. The powder paints have superior storage stability, and cured coatings obtained from them have superior smoothness, gloss, brightness, adhesiveness and mechanical strength. In addition, they exhibit good interlayer adhesiveness, and a good top coat can be obtained by recoating. Therefore, they offer the advantage that coating unevenness can be corrected on the same coating line.

The compound (1) serves to impart a glycidyl group

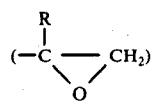

as a crosslinking functional group to the polymer [I], and is directly related to the mechanical and chemical properties of the resulting coatings. It is β-methylglycidyl (meth)acrylate of the general formula

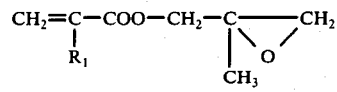

wherein $R_1$ is a hydrogen atom or a methyl group, or a mixture of it with glycidyl (meth)acrylate expressed by the general formula

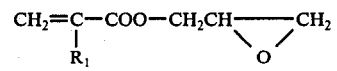

wherein $R_1$ is a hydrogen atom or a methyl group. The β-methylglycidyl (meth)acrylate is essential for the various properties of the coating such as smoothness or brightness and interlayer adhesiveness in recoating. On the other hand, the glycidyl (meth)acrylate serves to improve the mechanical properties (especially at bending) of the coating, and can be used conjointly to such an extent that does not impair the effect of the β-methylglycidyl (meth)acrylate. When using the glycidyl (meth)acrylate the suitable amount of the β-methylglycidyl (meth)acrylate is at least 30% by weight, preferably at least 45% by weight, of component (1). When the amount of component (1) is less than 10% by weight of the entire materials forming the polymer [I], its effect to improve the above properties is not sufficient, and on the other hand, when it exceeds 40% by weight, the resulting coating tends to have inferior smoothness. Usually, therefore, the feasible amount of component (1) is 10 to 40% by weight, preferably 15 to 30% by weight.

Styrene as the second material (2) serves to improve the smoothness and brightness of the coating. When it is less than 20% by weight, its effect of improving these properties is not sufficient, and on the other hand, when the amount exceeds 80% by weight, the resulting coating tends to have inferior weatherability. Usually, therefore, the suitable amount of the styrene (2) is 20 to 80% by weight, preferably 30 to 60% by weight.

The dialkyl ester of an aliphatic unsaturated dibasic acid as compound (3) serves to improve the mechanical strength (especially, adhesiveness after boiling and resistance to salt spray) of the resulting coating and interlayer adhesiveness at the time of recoating, and also the smoothness, gloss, brightness and adhesiveness of the coating in a well-balanced state. The dialkyl ester can be obtained by reacting an aliphatic unsaturated dibasic acid such as maleic acid, fumaric acid or itaconic acid with an aliphatic monohydric alcohol. The alkyl groups in the dialkyl ester suitably contain 1 to 18 carbon atoms, preferably 2 to 8 carbon atoms, and the two alkyl groups may be identical or different. Examples of the dialkyl ester include ethyl n-butyl fumarate, diethyl fumarate, di-n-butyl fumarate, ethyl n-butyl maleate, diethyl maleate, di-n-butyl maleate, ethyl-n-butyl itaconate, diethyl itaconate, di-n-butyl itaconate, di-n-propyl fumarate, di-n-pentyl fumarate, di-n-pentyl itaconate, di-n-propyl maleate, and di-2-ethylhexyl fumarate.

When the amount of the dialkyl ester is less than 3% by weight, its effect of improving the above properties is not sufficient, and when it exceeds 40% by weight, the resulting coating tends to have reduced stain resistance. Usually, therefore, the amount of the dialkyl ester (3) is 3 to 40% by weight, preferably 10 to 30% by weight.

When the amount of the dialkyl ester (3) is larger than that of styrene (2), the copolymerization reaction sometimes proceeds insufficiently or the mechanical strength of the resulting coating is reduced. Desirably, therefore, styrene is used in an amount larger than the amount of the dialkyl ester. Preferably, the styrene to dialkyl ester weight ratio is 1:1 to 10:1, especially 2:1 to 5:1.

The alkyl (meth)acrylate as the fourth material (4) is obtained by reacting (meth)acrylic acid with an aliphatic monohydric alcohol. The alkyl group of the ester suitably contains 1 to 18 carbon atoms, preferably 1 to 8 carbon atoms. Examples of the ester include methyl (meth)acrylate, ethyl(meth)acrylate, pentyl (meth)acrylate, isopropyl (meth)acrylate, n-butyl (meth)acrylate, and 2-ethylhexyl (meth)acrylate. This ester is an optional component. It must be used in such an amount that no marked acrylic smell occurs at the time of baking. Usually, the amount of the alkyl (meth)acrylate ester is up to 30% by weight, preferably up to 20% by weight.

In addition to the above materials, $\beta$-hydroxyethyl (meth)acrylate, $\beta$-hydroxypropyl (meth)acrylate, vinyl chloride, vinyl acetate, alkyl-substituted styrenes, and (meth)acrylonitrile can, for example, be used as desired in such amounts that do not impair the characteristics of the present invention.

The polymer used in this invention can be prepared by varios known methods such as a solution-polymerization method, suspension-polymerization method or bulk-polymerization method using a radical polymerization catalyst such as benzoyl peroxide, tertiary butyl peroxide, cumene hydroperoxide or azobisisobutyronitrile. In the case of the solution-polymerization method, the raw materials are reacted in an organic solvent which dissolves the resulting polymer, such as toluene, xylene, methanol, ethanol, propanol or butanol, and then the solvent is removed by any desired method such as pressure reduction, spray drying or film evaporation to collect the solid polymer. The end point of the polymerization reaction is one at which the polymer has a softening point, as measured by a ring-and-ball test, of 80° to 150° C., preferably 90° to 130° C., and a number average molecular weight, as measured by osmometry of 3,000 to 15,000, preferably 5,000 to 10,000.

The aliphatic saturated dibasic acid [II] incorporated as a curing agent in the polymer [I] contains 4 to 26 carbon atoms, but in view of its smoke-generating property at the time of baking and the smoothness of the resulting coating, it preferably contains 8 to 12 carbon atoms. Examples of such dibasic acids are ethane-1,2-dicarboxylic acid, butane-1,4-dicarboxylic acid, hexane-1,6-dicarboxylic acid, heptane-1,7-dicarboxylic acid, octane-1,8-dicarboxylic acid, nonane-1,9-dicarboxylic acid, decane-1,10-dicarboxylic acid, dodecane-1,12-dicarboxylic acid, tetradecane-1,14-dicarboxylic acid, hexadecane-1,16-dicarboxylic acid, octadecane-1,18-dicarboxylic acid, eicosane-1,20-dicarboxylic acid, and tetracosane-1,24-dicarboxylic acid.

The suitable ratio of the polymer [I] to the aliphatic saturated dibasic acid [II] for preparing the composition of this invention is 1:5 to 5:1, preferably 1:2 to 2:1 in terms of the ratio of the number of glycidyl groups of the polymer [I] to that of carboxyl groups of the aliphatic saturated dibasic acid [II].

The composition may further contain curing catalysts such as amines and acids to promote the cross-linking curing reaction of the composition; a bisphenol-type epoxy resin to improve the salt spray resistance of the resulting coating; a cellulose derivative to improve the smoothness of the coating; and a polymer of a long-chain alkyl ester of acrylic acid, a fluorine compound or a silicon compound to improve the smoothness of coating and prevent crater formation therein.

A powder paint can be prepared by adding pigments and other additives to the resulting resin composition in accordance with various known methods. These include, for example, a method which comprises dry-blending all of the components, melt-kneading the blend by an extruder, cooling the extrudate, and then pulverizing it; a method which comprises spray-drying a solution obtained by uniformly mixing the entire compoents with a solvent, or a method which comprises dispersing such a solution in water, evaporating off the solvent, and then collecting the resulting powder from the water. The resulting powder paint can be coated by known methods such as an electrostatic coating method or a fluidized bed coating. When the coating is baked at 150° to 240° C., cured coatings of superior quality can be obtained.

The following Examples and Comparative Examples illustrate the present invention. In these examples, all parts are by weight.

EXAMPLE 1

15 parts of $\beta$-methylglycidyl methacrylate, 10 parts of glycidyl methacrylate, 40 parts of styrene, 15 parts of di-n-butyl fumarate, 20 parts of n-butyl methacrylate, 4-parts of azobisisobutyronitrile and 1 part of benzoyl peroxide were added dropwise to a mixture heated at 100° C. of 70 parts of toluene and 30 parts of n-butanol over the course of 4 hours, and for an additional 10 hours, these materials were reacted. The solvent was removed by evaporation at 200° C. and 1 mmHg to afford a solid polymer which had a softening point (ring-and-ball method) of 106° C. and a number average molecular weight of 7,500.

To 100 parts of the resulting vinyl polymer were added 15 parts of decane-1,10-dicarboxylic acid, 5 parts of EPICLON 1050 (trademark for a bisphenol-type epoxy resin having an epoxy equivalent of 1,000, a product of Dainippon Ink and Chemicals, Inc.), 50 parts of titanium oxide and 1 part of a flowability adjuster (a polymer of 2-ethylhexyl acrylate with a number average molecular weight of 10,000), and they were dry-blended. The blend was melt-kneaded by a heated extruder, cooled, and finely pulverized.

Fine particles that passed through a 200-mesh Tyler screen were coated on a mild steel panel by an electrostatic coating method, and baked at 200° C. for 20 minutes to form a coating having a thickness of about 40 microns.

EXAMPLE 2

A powder paint and a coating of it were obtained by operating in the same way as in Example 1 except that 13 parts of octane-1,8-dicarboxylic acid was used instead of 15 parts of decane-1,10-dicarboxylic acid.

EXAMPLE 3

25 parts of $\beta$-methylglycidyl methacrylate, 50 parts of styrene and 25 parts of diethyl fumarate were polymerized by the same method as described in Example 1 to afford a polymer having a softening point (ring-and-ball method) of 111° C. and a number average molecular weight of 7,000.

Using this polymer, a powder paint and a coating of it were prepared by the same procedure as in Example 1.

EXAMPLE 4

15 parts of β-methylglycidyl methacrylate, 10 parts of β-methylglycidyl acrylate, 10 parts of glycidyl methacrylate, 45 parts of styrene, 15 parts of methyl-n-butyl maleate and 10 parts of isobutyl methacrylate were polymerized by operating in the same way as in Example 1 to afford a polymer having a softening point (ring-and-ball method) of 108° C. and a number average molecular weight of 8,000.

83 parts of the polymer was dry-blended with 17 parts of decane-1,10-dicarboxylic acid, 3 parts of EPICLON 850 (trademark for a bisphenol-type epoxy resin having an epoxy equivalent of 450, a product of Dainippon Ink and Chemicals, Inc.), 25 parts of titanium oxide and 0.2 part of a flowability adjuster (a perfluoroacrylate polymer with a number average molecular weight of 7,000), and the blend was melt-kneaded by a heated extruder. The extrudate was cooled, and finely pulverized.

Particles that passed through a 200-mesh Tyler screen were coated on a mild steel panel by an electrostatic coating method, and baked at 180° C. for 20 minutes.

EXAMPLE 5

A dispersion consisting of 100 parts of water and 5 parts of calcium phosphate was stirred at 50° C., and 20 parts of β-methylglycidyl methacrylate, 40 parts of styrene, 20 parts of di-n-butyl maleate, 20 parts of isobutyl methacrylate, 4 parts of azobisisobutyronitrile and 3 parts of lauryl mercaptan were added to the stirred dispersion. The mixture was heated to 80° C., and the materials were polymerized in suspension for 10 hours. The resulting polymer was collected by filtration and dried. The polymer had a softening point (ring-and-ball method) of 105° C. and a number average molecular weight of 7,200.

Using this polymer, a powder paint and a coating of it were prepared by operating in the same way as in Example 1.

EXAMPLE 6

15 parts of β-methylglycidyl methacrylate, 15 parts of glycidyl methacrylate, 60 parts of styrene and 10 parts of dipentyl itaconate were polymerized in the same way as in Example 5 to afford a polymer having a softening point (ring-and-ball method) of 110° C. and a number average molecular weight of 6,500.

Using this polymer, a powder paint and a coating of it were prepared by operating in the same way as in Example 4.

COMPARATIVE EXAMPLE 1

The procedure of Example 1 was repeated except that isobutyl methacrylate and methyl methacrylate were used instead of the di-n-butyl fumarate and styrene respectively, in the same amounts, thereby to afford a polymer having a softening point (ring-and-ball method) of 112° C. and a number average molecular weight of 8,000.

Using the polymer, a powder paint and a coating of it were prepared by operating in the same way as in Example 1.

COMPARATIVE EXAMPLE 2

The same procedure as in Example 3 was repeated except that glycidyl methacrylate was used instead of the β-methylglycidyl methacrylate, in the same amount, thereby to afford a polymer having a softening point (ring-and-ball method) of 118° C. and a number average molecular weight of 7,800.

Using the polymer, a powder paint and a coating of it were prepared by operating in the same way as in Example 3.

The powder paints and the coatings obtained in the above examples were tested for the various properties. The results are tabulated below.

| Properties | Runs | | Examples | | | | | Comparative Examples | |
|---|---|---|---|---|---|---|---|---|---|
| | 1 | 2 | 3 | 4 | 5 | 6 | 1 | 2 |
| Brightness | Excellent | Excellent | Excellent | Excellent | Excellent | Good | Fair | Bad |
| Smoothness | Excellent | Excellent | Excellent | Excellent | Excellent | Excellent | Orange peel | Orange peel |
| 60° Specular Gloss | 94 | 89 | 91 | 91 | 91 | 88 | 80 | 78 |
| Impact Resistance | 30 | 40 | 50 | 50 | 40 | 30 | <10 | 30 |
| Erichsen (mm) | >7 | >7 | >7 | >7 | >7 | 7 | <1 | >7 |
| Bending (mm) | 6 | 6 | 6 | 6 | 10 | 6 | 10 | 6 |
| Xylene Rubbing | >100 | >100 | >100 | >100 | >100 | >100 | >100 | >100 |
| Stain Resistance | Good | Good | Good | Good | Good | Good | Good | Good |
| Weatherability (%) | 85 | 88 | 87 | 80 | 78 | 71 | 80 | 78 |
| Adhesiveness after Boiling | Good | Good | Excellent | Good | Good | Good | Bad | Good |
| Salt Spray (mm) | <1 | <1 | 2 | 2 | <1 | 1 | 1 | <1 |
| Storage Stability | Good | Good | Good | Good | Good | Good | Good | Good |
| Recoating | Good | Good | Good | Good | Good | Good | Bad | Bad |

The above properties were measured by the following methods.

Brightness and Smoothness

Observed visually.

60° Specular Gloss

Using a reflection index measuring apparatus, the index of reflection of the sample coating was measured when the angle of incidence and the angle of reflection from a light source were both 60° C. When light is perfectly reflected, this value is 100.

Impact Resistance

A steel ball of ½ inch in diameter was placed on the coating and a load weighing 500 g was let fall on the steel ball from various heights. The drop height which caused the peel off of the coating from the substrate was measured.

Erichsen

A 8-mm thick rolled mild steel panel coated with the resin composition on one surface was fixed, and pushed from the side of the uncoated surface at a speed of 0.1 mm/second by means of a punch having a diameter of 20 mm at right angles to the surface, until cracks occurred in the coating. The distance over which the steel panel had been pushed during this time was measured.

Bending

A round steel rod with varying diameters was contacted with the back surface of the coated steel panel, and the steel panel was bent along the periphery of the steel rod. By this procedure, the crack resistance of the coating was measured. The test was carried out while varying the round steel rod from one having a diameter of 10 mm to one having a diameter of 8 mm, 6 mm, 4 mm, and 2 mm respectively, in decreasing order. The crack resistance was expressed by the diameter of a round steel rod that had the smallest diameter among those rods which did not cause cracking of the coating at the time of bending.

Xylene Rubbing.

The coated surface of the sample was strongly rubbed with an adsorbent cotton wad soaked with xylene until the coating was peeled off. The number of rubbing cycles required for this was measured.

Stain Resistance

An oily ink was adhered to the coated surface, and then wiped off with a cloth. The degree of soiling of the coated surface was then observed visually.

Weatherability

The sample was exposed outdoors for one year, and then the 60° specular gloss of the sample was measured by the method described above. The percentage of the measured value as against the 60° specular gloss before exposure was calculated.

Adhesiveness after boiling

The sample coating was immersed for 2 hours in boiling water, and then allowed to stand at 25° C. for 2 hours. An X-shaped cut was provided on the coated surface of the sample, and a pressure-sensitive adhesive tape was applied to that part. The tape was then peeled off, and the state of removal of the coated surface was evaluated visually.

Salt Spray

An X-shaped cut was provided on the coated surface of the sample, and a 5% salt water was sprayed onto the coated surface at 35° C. for 500 hours. Then, a pressure-sensitive adhesive tape was applied to the cut portion, and then peeled off from it. The peel width of the coating was measured.

Storage Stability

The sample powder paint was allowed to stand at 35° C. for one month, and then the condition of the paint was observed visually.

Recoating

The same powder paint was coated under the same conditions on top of the coating obtained in each of the examples. An X-shaped cut was provided on the recoated surface of the sample, and a pressure-sensitive adhesive tape was applied to that part. Then, the tape was peeled off, and the adhesiveness between the top layer and the under layer was visually evaluated.

What we claim is:

1. A thermosetting resin composition which comprises
   I. a polymer consisting of (1) 10 to 40% by weight of β-methylglycidyl (meth)acrylate or a mixture thereof with glycidyl (meth)acrylate, (2) 20 to 80% by weight of styrene (3) 3 to 40% by weight of a dialkyl ester of an aliphatic unsaturated dibasic acid and (4) 0 to 30% by weight of an alkyl (meth)acrylate, said polymer being prepared by polymerizing said components (1), (2), (3) and (4) in the above-indicated amounts in the presence of a radical polymerization catalyst, said polymer having a softening point of 80° to 150° C as measured by the ring-and-ball method, and a number average molecular weight of 3,000 to 15,000 as measured by osmometry, and
   II. an aliphatic saturated dibasic acid.

2. The composition of claim 1 wherein the ratio of the number of glycidyl groups in the polymer [I] to the number of carboxyl groups in the aliphatic saturated dibasic acid [II] is 1:5 to 5:1.

3. The composition of claim 1 wherein the weight ratio of styrene to the dialkyl ester of an aliphatic unsaturated dibasic acid is 1:1 to 10:1.

4. The composition of claim 1 wherein the β-methylglycidyl (meth)acrylate is β-methylglycidyl methacrylate.

5. The composition of claim 1 wherein the dialkyl ester of an aliphatic unsaturated dibasic acid is a dialkyl ester of fumaric acid.

6. The composition of claim 1 wherein the β-methylglycidyl (meth)acrylate accounts for at least 30% by weight of component (1).

7. A thermosetting resin composition for powder paints which comprises
   I. a polymer consisting of (1) 10 to 40% by weight of β-methylglycidyl (meth)acrylate or a mixture thereof with glycidyl (meth)acrylate, (2) 20 to 80% by weight of styrene, (3) 3 to 40% by weight of a dialkyl ester of an aliphatic unsaturated dibasic acid wherein each alkyl group contains 1 to 18 carbon atoms and (4) 0 to 30% by weight of an alkyl (meth)acrylate wherein the alkyl group contains 1 to 18 carbon atoms, said polymer being prepared by polymerizing said components (1), (2), (3) and (4) in the above-indicated amounts in the presence of a radical polymerization catalyst, said polymer having a softening point of 80 to 150° C as measured by the ring-and-ball method, and a number average molecular weight of 3,000 to 15,000 as measured by osmometry, and
   II. an aliphatic saturated dibasic acid containing 4 to 26 carbon atoms,
   the ratio of the number of glycidyl groups in the polymer [I] to the number of carboxyl groups in the aliphatic saturaed dibasic acid [II] being 1:5 to 5:1, and the weight ratio of styrene to the dialkyl ester of an aliphatic unsaturated dibasic/acid being 1:1 to 10:1.

8. The composition of claim 7 wherein the β-methylglycidyl (meth)acrylate is β-methylglycidyl methacrylate.

9. The composition of claim 7 wherein the dialkyl ester of an aliphatic unsaturated dibasic acid is a dialkyl ester of fumaric acid.

10. The composition of claim 7 wherein the β-methylglycidyl (meth)acrylate accounts for at least 30% by weight of component (1).

* * * * *